Patented Oct. 23, 1928.

1,688,500

UNITED STATES PATENT OFFICE.

CARL KULAS, OF LEIPZIG, GERMANY.

METHOD OF PRODUCING PLASTIC AND MOLDABLE COMPOSITION.

No Drawing. Application filed January 2, 1926. Serial No. 79,027.

My invention relates to a plastic and moldable composition of matter and to the method of producing the same. The composition of matter referred to is somewhat analogous to artificial resin and is usable for the same purposes.

It is common practice to produce plastic and moldable bodies by the admixture of resol and various kinds of fillers, these bodies being molded to the desired shape in heated presses and thereafter converted into the infusible and insoluble state by the simultaneous application of heat and pressure. A somewhat similar method is that by which the plastic bodies are molded in heated presses and then, by being subjected to the simultaneous action of heat and atmospheric pressure in a retort or other closed vessel, the resol which may or may not have had a filler admixed therewith is converted into resitol and resit, which is the final infusible and insoluble state.

Various kinds of fillers have been employed, such as asbestos, paper fibre, pulverulent kaolin, talcum, baryta, kieselguhr, brick dust, sawdust, ground straw and the like, and despite the greatest care taken to dry these fillers they still contain more or less moisture when mixed with the resol, and this moisture cannot completely escape during the process because the particles of water are entirely enveloped by the resol.

The plastic material contemplated by the present invention is largely used for electrical insulation purposes, and the presence of moisture in such insulators is detrimental and frequently the cause of operating troubles. As current flows through the conductors in connection with which the insulation is used, the water particles are set in motion and force their way to the surface of the insulation where they cause cracks and fissures to appear, which render the insulation useless for its intended purpose.

A further disadvantage of the fillers heretofore commonly employed is that they are inherently hard and brittle, and when the insulating material in which they are incorporated is subjected to shocks or is otherwise injured, release of internal tension is promoted so that breaks and tears occur, and the insulating material cannot be further used as such.

According to my invention I produce simply and economically, a new plastic substance which is ideally adapted for use as an electric insulating material and also for the manifold other purposes to which synthetic or artificial resin is put.

Resol, which is the initial condensation product of phenol-formaldehyde reaction, and rubber are, each, in the hardened or vulcanized state especially well adapted for use as electric insulators. The physical properties of these two substances are radically different, because resit which results from hardening resol is a very hard body, while vulcanized rubber is a soft elastic body. However, these two substances have the characteristic, in common, of being excellent insulators for electrical purposes.

The combination of these two substances, in the manner about to be described according to my invention, results in the production of a new substance which not only combines the several virtues of the constituent substances but greatly exceeds these in excellence of mechanical properties and value as an electric insulator.

In accordance with the method of my invention I mix together 50 parts by weight of resol and 50 parts by weight of any suitable solvent such as denatured alcohol or acetone, or the like, and stir the mixture either hot or cold until the resol has been completely dissolved. The resulting mass is a viscous resol solution to which I then add either 100 parts by weight of pulverized rubber scrap or waste, or a mixture of 50 parts by weight of rubber scrap or waste and 50 parts by weight of any desired filler and coloring matter. The character or constitution of the last named mixture (rubber scrap, filler and coloring matter) is governed by the degree of hardness and the color which it is desired that the final product shall have. The entire mixture is caused to boil lightly, and is constantly stirred (preferably in a closed vessel provided with a reflux cooler) until all the constituents have been intimately mixed together and a rubber like plastic mass results.

The solvent which was used for dissolving the resol is recovered by distillation, and may be reused after being freed of rubber and filler particles, and of any other impurities which it may contain.

At this stage of the method the resol-rubber mass has been freed of the greater part of its liquid content, and for the purpose of rendering the mass homogeneous and freeing it of any remaining volatile constituents, the mass is passed at a rapid rate in thin layers through a calendering machine the temperature of which is slightly higher than the boiling point of the solvent which was used to dissolve the resol.

Thereupon the product is placed in a moderately heated chamber, the temperature of which is about 30 to 40 degrees Celsius, and is permitted to remain there for about fourteen days. Throughout this time the temperature within the chamber is maintained constant, thus initiating and carrying through a reaction which promotes the seasoning and plasticity of the mass and conditions it for the subsequent treatment by which the mass is converted into a hard material. While the mass is in the heated chamber, and at the end of the seasoning period, its consistency is somewhat like that of unvulcanized rubber and it may be subjected to further treatment in the same kinds of molds and presses, and with the same kinds of tools, as unvulcanized rubber, for the purpose of producing the desired final forms.

After the mass has been formed or molded into articles of the desired shapes and sizes, the articles are placed into a drying chamber, the initial temperature of which is about 60 degrees Celsius. Dependent upon the shapes and sizes of the articles, the latter may rest in the drying chamber in forms or molds or may be unenclosed in molds. The articles in the drying chamber are hardened by gradually raising the temperature in the drying chamber from the initial 60 degrees Celsius to about 160 degrees Celsius, without the application of any mechanical or air pressure, until the required substantially infusible and insoluble condition of the articles has been attained. The duration of the hardening process depends upon the form and volume of the articles under treatment.

If, instead of being merely molded, the articles are to be machined or subjected to tool manipulation, it is desirable to interrupt the hardening process at a stage at which a sample article cooled down to ordinary room temperature is sufficiently hard to be bored, drilled, planed or otherwise tool manipulated without deformation; then to carry out the desired manipulation and finally to replace the machined articles in the drying chamber to complete the hardening process.

The machining of the articles before completion of the hardening process has very decided advantages, inasmuch as at this intermediate stage the articles are still substantially elastic and offer comparatively little mechanical resistance to the tools, so that the effectiveness of the latter can be exerted to the full.

The hardening process should not be continued beyond the stage at which a sample, dipped in fuming alcohol for say one minute, no longer shows any tendency to dissolve. To continue the hardening process beyond this stage is detrimental as the chemical composition of the product will be adversely affected.

By employing my new composition of matter in the method described above, a most valuable product is obtained which is usable for electric insulation and many other purposes. The material is entirely free of internal tension because, by reason of the absence of pressure in the method, the volatile constituents which are present in other materials of this general character are absent from material made by the process described.

Articles of practically any size and weight may be produced, particularly if in molding or forming the articles the expedients generally employed in the manufacture of porcelain are used.

I claim:—

1. The herein described method of producing a composition of matter for the purposes specified, consisting in mixing together dissolved resol and comminuted rubber, rapidly calendering the mass to expel volatile constituents therefrom and render it homogeneous, seasoning the mass at a moderate temperature maintained constant during the seasoning period, and finally drying the mass.

2. The herein described method of producing a composition of matter for the purposes specified, consisting in mixing together dissolved resol and comminuted rubber, rapidly calendering the mixture in thin layers to expel its volatile constituents and render it homogeneous, seasoning the mass for a relatively extended period at a moderate temperature maintained constant throughout the seasoning period, and finally drying the mass at a gradually increasing temperature.

In testimony whereof I have affixed my signature.

CARL KULAS.